R. E. ROSEWARNE.
VARIABLE SPEED MECHANISM.
APPLICATION FILED NOV. 19, 1907.
977,403.
Patented Nov. 29, 1910.
2 SHEETS—SHEET 2.
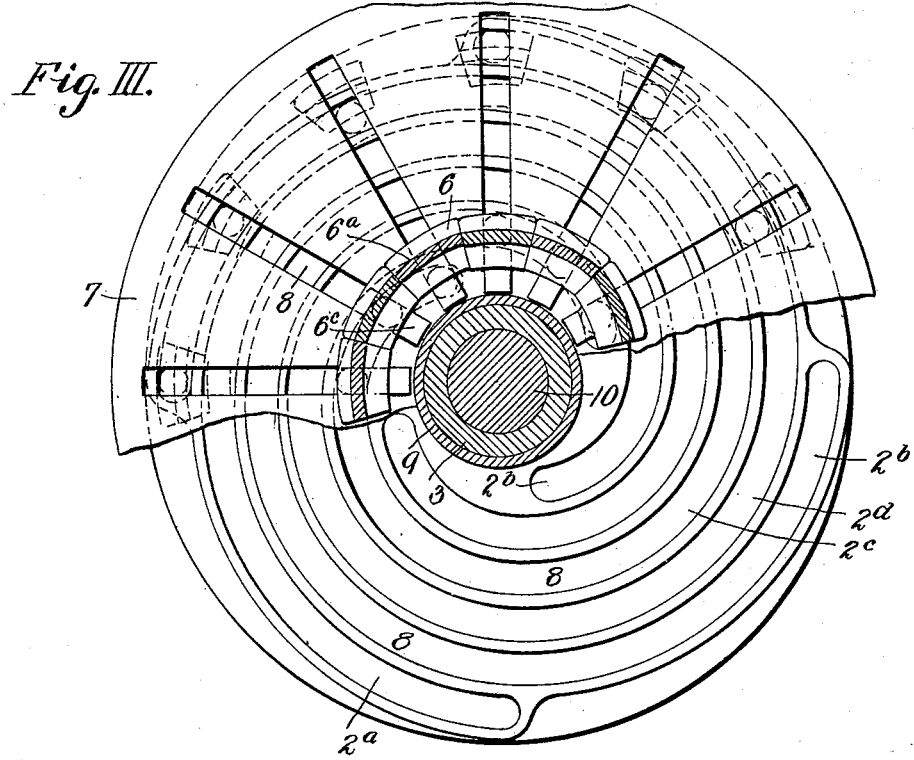
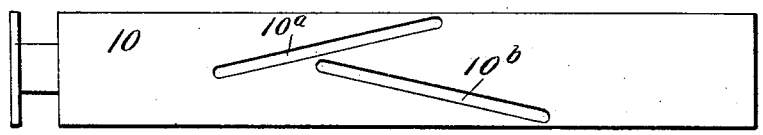
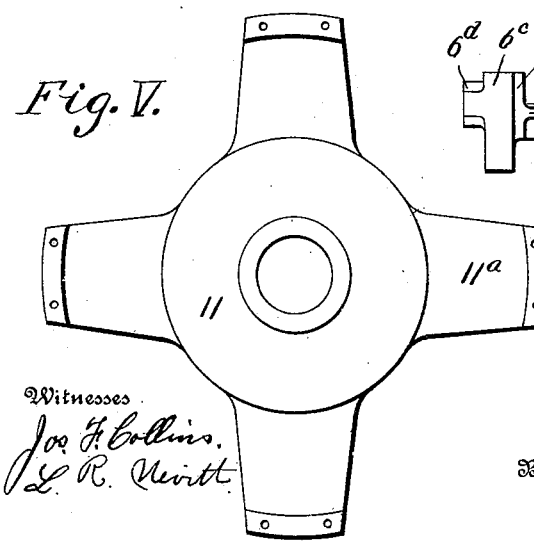
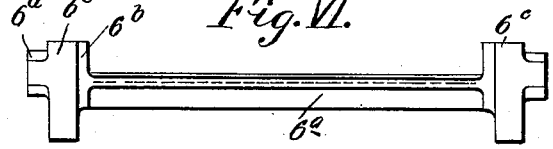
Inventor
Richard E. Rosewarne,
Witnesses
Jos. F. Collins
L. R. Nevitt
By
Knight Bros
Attorneys

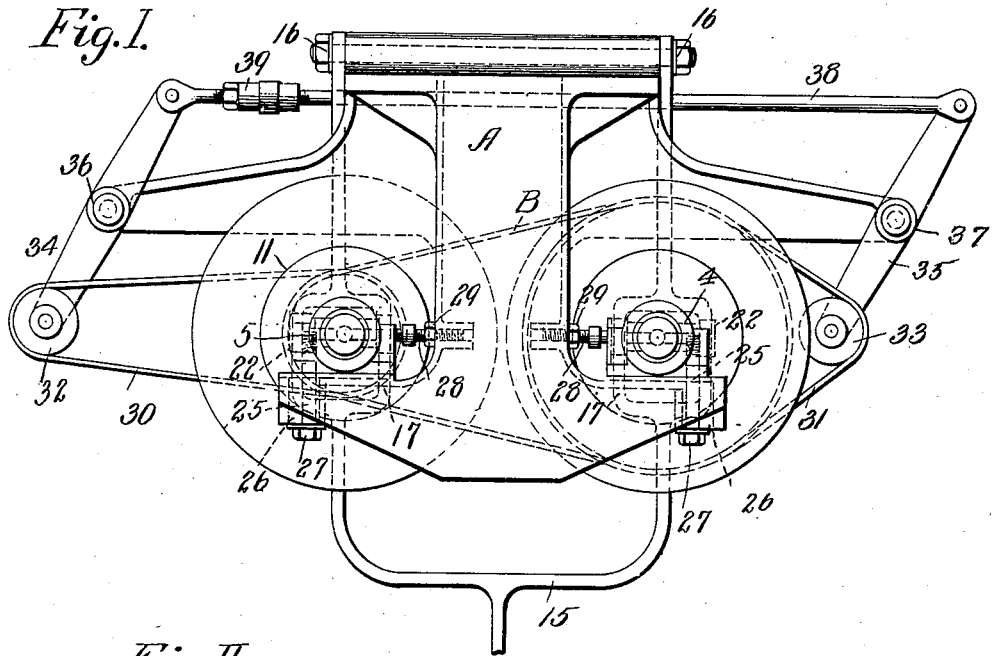
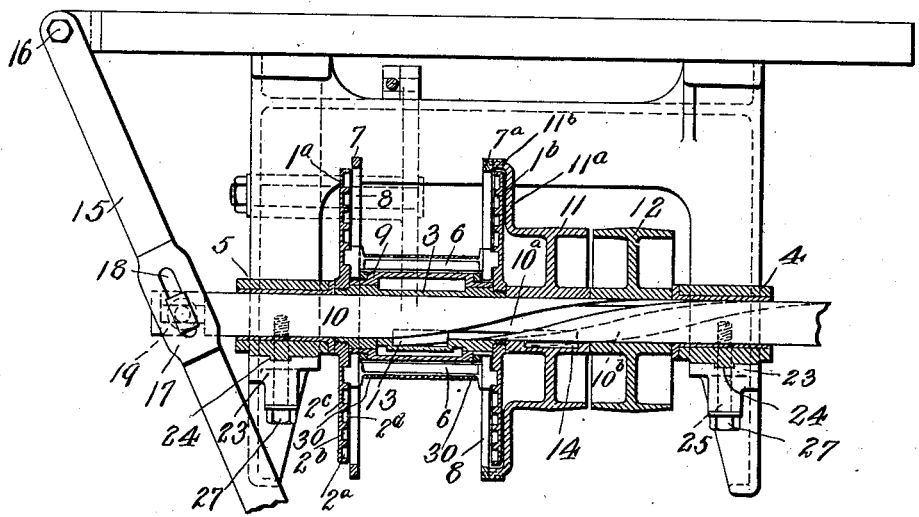
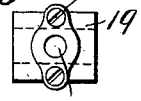 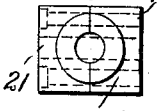 

UNITED STATES PATENT OFFICE.

RICHARD E. ROSEWARNE, OF COVINGTON, KENTUCKY, ASSIGNOR TO THE MILLER, DU BRUL & PETERS MANUFACTURING COMPANY, OF CINCINNATI, OHIO, A CORPORATION OF OHIO.

VARIABLE-SPEED MECHANISM.

977,403.  Specification of Letters Patent.  Patented Nov. 29, 1910.

Application filed November 19, 1907. Serial No. 402,830.

*To all whom it may concern:*

Be it known that I, RICHARD E. ROSE-WARNE, a citizen of the United States, and resident of Covington, in the county of Kenton and State of Kentucky, have invented certain new and useful Improvements in Variable-Speed Mechanisms, of which the following is a specification.

The present invention relates to variable speed mechanisms and particularly to the type in which a pair of expansible pulleys is employed.

The invention is an improvement on the speed mechanism shown and described in my Letters Patent No. 849,750, dated April 9, 1907.

An object of the invention is to facilitate the adjustment of the pulleys which I accomplish by causing the holding disks and the guide disks to rotate in opposite directions during the adjustment of the pulleys. Furthermore I employ a plurality of spiral grooves in the guide disks and make these grooves of a very great pitch whereby it is possible to effect complete adjustment of the pulleys in approximately one half of a revolution of the guiding disks and holding disks.

Another object is to provide improved means for preventing the rattle of the rim sections of the pulleys in the spiral grooves of the disks when they pass from under their main belt.

A further object is to provide improved means for taking up slack of the main belt.

Other and further objects will appear in the following description and will be more particularly pointed out in the appended claims.

In the accompanying drawings, Figure I is a side elevation of a variable speed mechanism embodying my invention; Fig. II is an axial section through one of the pulleys, some parts being shown in elevation; Fig. III is a transverse section of the pulley, the holding disk being broken away to show the guide disk; Fig. IV is a development of the adjuster shaft; Fig. V is a side elevation of the driven or driving pulley; Fig. VI is a detail view of one of the rim sections; and Fig. VII is an end view of the same; Figs. VIII, VIII$^a$, IX and X are detail views of the means for connecting the adjuster shaft with the operating lever.

Referring more particularly to the drawings, A indicates the frame of the mechanism in each end of which is journaled an expansible pulley, the pulleys being connected by a belt B and one acting to drive the other. Each pulley is formed of a pair of guide disks 1$^a$ and 1$^b$ having their opposed faces provided with a plurality of spiral guide grooves 2$^a$, 2$^b$, 2$^c$, 2$^d$, there being preferably four guide grooves in each disk. The grooves are of great pitch and each groove has only one complete convolution and has its inner end located near the inner edge of the disk and its outer end located near the periphery of the disk. The disks 1$^a$ and 1$^b$ are connected with one another by means of a sleeve 3 which is secured to the disks in any suitable manner.

Connecting the opposed faces of the guide disks 1$^a$ and 1$^b$ is a series of rim sections 6 which have a belt portion 6$^a$, flanges 6$^b$ at the ends of the belt portions, rectangular members 6$^c$ and studs 6$^d$ at the ends of the rim sections. The studs 6$^d$ engage in the spiral grooves of the guide disks and the rectangular members 6$^c$ engage in radial slots 8 in a pair of controlling disks 7 and 7$^a$ arranged adjacent to the guide disks. The controlling disks are connected to each other by a sleeve 9 which is rotatably mounted on the sleeve 3. The controlling disks have a greater diameter than the guide disks so that the former project beyond the latter.

Journaled in bearings 4 and 5 on the frame A is an adjuster or operating shaft 10 which extends through the sleeve 3. On the shaft 10 is mounted a driving or driven pulley 11 having a number of radial projections 11$^a$ which are provided with flanges 11$^b$ secured to the projecting portion of the controlling disk 7$^a$. Between the pulley 11 and the bearing 4 an idler 12 is mounted on the shaft 10. A pair of helical grooves 10$^a$ and 10$^b$ are provided in the shaft 10 in which engage shoes 13 and 14 engaging respectively with the sleeve 3 and pulley 11. The grooves 10$^a$ and 10$^b$ are oppositely threaded so that, when the shaft 10 is moved axially, the pulley 11 and the controlling disks 7 and 7$^a$ will be caused to rotate in one direction while the sleeve 3 and the guide disks 1$^a$ and 1$^b$ are caused to rotate in the opposite direction. It is apparent that the rotary movement of the disks 1$^a$, 1$^b$, 7 and 7$^a$ will cause the rim sections 6 to move inwardly or outwardly in the grooves 8 and as the spiral grooves in the guide disks are of great pitch the pulley can be adjusted with great rapidity. In Figs. II and III the pulley is shown contracted while the expanded condition of the pulley is shown in dotted lines in Fig. III. The two pulleys are adjusted simultaneously by means of a forked operating lever 15 pivoted at 16 and having a pair of closed yokes 17 each provided with a longitudinal slot 18. On the end of each operating shaft is mounted a sleeve 19 which preferably consists of two parts connected together by means of bolts 20. The sleeve is provided with a perforation 21 and a dog 22 extending into the slot 18 and perforation 21 connects the operating lever with the sleeve 19 and permits of the shaft 10 being shifted axially by means of the operating lever while at the same time permitting of the operating shaft rotating in the sleeve 19.

It is apparent that if the grooves 10$^a$ and 10$^b$ in the shaft 10 are left and right the corresponding grooves in the operating shaft of the other pulley must be right and left as one of the pulleys must be contracted while the other is being expanded, or the grooves in both shafts may be alike if the guide disks 1$^a$, 1$^b$ are mounted on the separate pulleys so as to be right and left to said separate pulleys.

The bearing boxes 4 and 5 for the pulleys are adjustable to take up belt slack. To that end each bearing is slidably mounted on a support 23 secured on the frame A. The box has groove and tongue connection 24 with the support 23 and a vertical bolt 25 secured in the box projects downwardly through an elongated slot 26 in the support. A nut 27 on the lower end of the bolt normally holds the box securely on the support. By means of a suitable screw take-up 28, 29 the bearing boxes of one of the pulleys may be adjusted to and from the boxes of the other pulley after the nuts 27 have been loosened. During the adjustment of the bearing boxes the bolts 25 move in the elongated slots 26 and the dogs 22 move in the perforation 21 of the sleeve 19.

To prevent rattling of the rim sections 6 when they move from under their main belt, I provide minor belts 30, 31 which tightly hold the rim sections on their seats. Preferably, two such belts are used in connection with each pulley, one on each side of the main belt B, but one belt only may be used for this purpose. The belts 30, 31 pass over pulleys 32, 33 journaled in levers 34, 35. These levers are pivoted intermediate of their ends at 36, 37 in the frame A and are connected to each other by means of a connecting rod 38 which is provided with a suitable turn buckle 39 to take up belt-slack. When the lever 34 and its pulleys are drawn inwardly by the expansion of one of the expansible pulleys the other lever is automatically moved outwardly by means of the connecting rod 38 and the tension of the minor belt is automatically maintained at any position of the expansible pulleys.

Having thus described my invention, what I claim and desire to secure by Letters Patent is:—

1. The combination of an axially movable shaft provided with a right-hand and a left-hand helical groove therein, a pair of spirally grooved disks, a sleeve rotatable on the shaft and connecting said disks rigidly together, said sleeve being provided with a recess inclined at the angle of the left-hand groove in the shaft, a relatively short block lying wholly within the space provided by said left-hand groove and its corresponding recess and adapted to have sliding movement in said groove, radially slotted disks connected rigidly together and disposed within and immediately adjacent the faces of the spirally slotted disks, rim sections supported by said disks, a pulley rigidly secured to said radially slotted disks and provided in the bearing face with a recess inclined at the same angle as the right-hand groove in the shaft, and a relatively short block lying within the space provided by said right-hand groove and its corresponding recess and adapted to have sliding movement in said groove.

2. The combination with radially slotted members and spirally grooved members and rim sections mounted therein, of means for rotating the radially slotted members relatively to the spirally grooved members, said means comprising an axially movable shaft having oppositely threaded helical grooves, a sleeve rigidly connecting said spirally grooved members and provided with a relatively short recess disposed within and medially of the ends of the sleeve, said recess being inclined to correspond to one of said grooves, a pulley rigidly connected with said radially-slotted members, said pulley being provided in its hub portion with a relatively short recess inclined to correspond to the other of said grooves, and relatively short blocks lying wholly within the spaces provided by said recesses and grooves and adapted to have sliding movement in said grooves.

3. The combination of a pair of operating shafts, an expansible pulley on each shaft, an operating lever for the shafts, bearings for the shafts, means whereby the bearings of one shaft may be adjusted to and from the bearings of the other shaft, and a connection between the operating lever and the operating shafts permitting adjustment of the bearings.

4. The combination with a pair of expansible pulleys each comprising a plurality of adjustable rim sections, of means for holding the rim sections on their seats when they pass from under their main belt; said means comprising a minor belt for each pulley, an additional pulley for each of the minor belts, and a connection between the additional pulleys whereby the tension on the minor belts is automatically maintained at any adjusted position of the expansible pulleys.

The foregoing specification signed at Cincinnati Ohio this 6th day of September, 1907.

RICHARD E. ROSEWARNE.

In presence of two witnesses—
E. F. Du Brul,
D. S. Du Brul.